United States Patent [19]

Kleiner

[11] Patent Number: 4,905,738
[45] Date of Patent: Mar. 6, 1990

[54] CONTROL FOR A ROTARY DOBBY HEALD FRAME CONNECTING ROD

[76] Inventor: Ernst Kleiner, Schlieregg, CH-8816 Hirzel, Switzerland

[21] Appl. No.: 139,651

[22] Filed: Dec. 30, 1987

[30] Foreign Application Priority Data

Jan. 5, 1987 [CH] Switzerland .............. 9/87-6

[51] Int. Cl.$^4$ .............................................. D03C 1/00
[52] U.S. Cl. .................................................. 139/76
[58] Field of Search ............... 139/76, 66 R, 66 A; 74/570, 595, 112, 116, 570, 527; 192/71, 28, 84

[56] References Cited

U.S. PATENT DOCUMENTS 4,433,704  2/1984  Decuq ........................ 139/66 R
4,614,211  9/1986  Mettler ....................... 139/76
4,646,788  3/1987  Brock et al. ................ 139/76
4,763,697  8/1988  Serturni ..................... 139/76

Primary Examiner—Andrew M. Falik
Attorney, Agent, or Firm—Watson, Cole, Grindle & Watson

[57] ABSTRACT

The control system of a coupling apparatus of a dobby loom includes a hollow drive shaft, at least one eccentric hoop supported thereupon and a connecting rod arranged therearound for a controlled drive of an element. A dog is supported radially displaceable in the eccentric hoop and may be brought in a controlled manner via corresponding actuating means into engagement either into one of two recesses of the connecting rod or in one of two recesses of the drive shaft. For structural simplicity, the actuating means and the direct control means for the dog are located within the drive shaft, i.e. in the center of roation of the coupling.

6 Claims, 8 Drawing Sheets

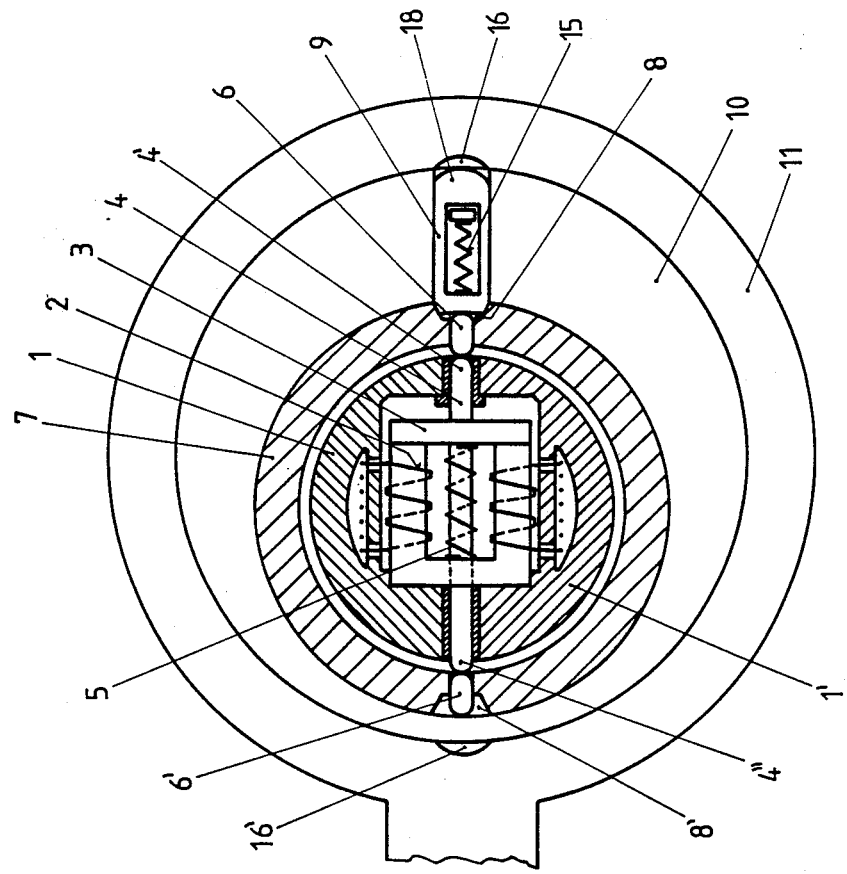
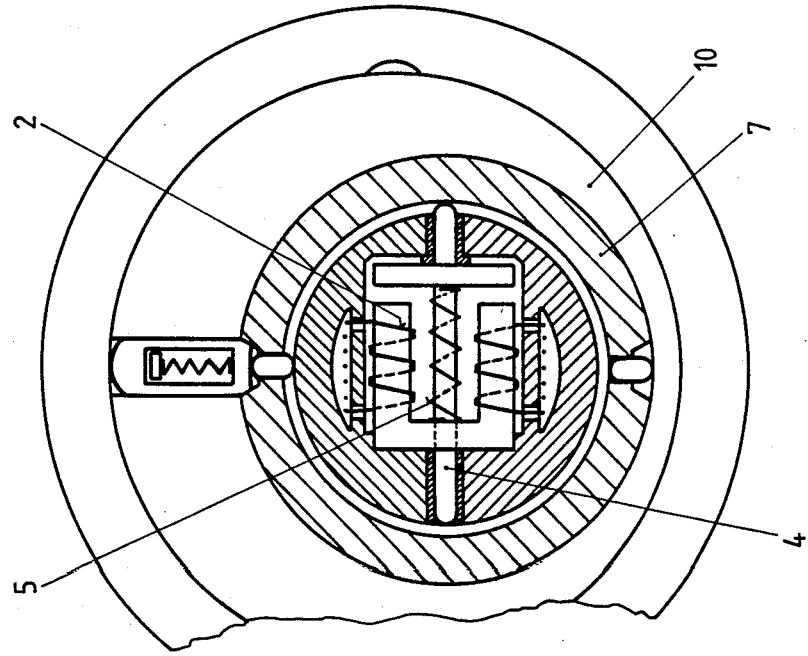
Fig. 2
Fig. 3

CONTROL FOR A ROTARY DOBBY HEALD FRAME CONNECTING ROD

BACKGROUND OF THE INVENTION

1. Field of the Invention

The present invention relates to a control system of a coupling apparatus specifically of a rotary dobby loom, including a drive shaft, at least one eccentric hoop supported slidably or rotationally thereupon including a connecting rod arranged circumferentially therearound, which connecting rod is intended to be coupled to a member which is to be moved in a controlled manner, specifically a heald of a weaving machine, including further a dog which is supported in said eccentric hoop in a radially displaceable manner and is movable via operating and control means into engagement either into one of two recesses of the connecting rod or into one of two recesses of the drive shaft.

2. Description of the Prior Art

Modern dobby looms are based presently on electromagnetic control systems which are combined with programmable electronics. Such control systems are disclosed for instance in the European Patent Specifications EP 0 079843, JEP 0 068139 or EP 8 0105440.4. These systems comprise combinations of magnetic and mechanical control elements in which the respective mechanical part must act as memory and amplifier and contains always one or a plurality of control cams. In common among the aforementioned control systems is that they are located outside of the center of rotation of the coupling apparatus proper, that they include correspondingly large elements having relatively long distances of function or operation respectively, which generate large acceleration and deceleration forces in case of high rotational speeds of the machines; such augments in turn their wear and noise generation. Furthermore, the outer dimensions of these constructions which are due to their specific kind of operations are quite voluminous such that often disassembling difficulties arise in connection with the weaving machine. In order to allow a simple elimination of weaving flaws a dobby loom should additionally be in a position to be rotated from any position backwards in correspondence with the program, a task which can be accomplished with the aforementioned systems partly only by exertion of considerable efforts or then not at all.

SUMMARY OF THE INVENTION

It is, therefore, a general object of the invention to provide a control system for a coupling apparatus, specifically of a rotary dobby loom, which avoids the aforementioned drawbacks and allows accordingly high operational speeds and is independent from the sense of rotation and lends itself to a compact design.

A further object is to provide a control system for a coupling apparatus in which the operating means and at least parts of the control means for each dog are located inside the drive shaft.

According to the invention the stationary control system is located inside of the drive shaft, i.e. in the center of the coupling apparatus and preferably comprises one solenoid for each connecting rod having an armature which is combined with a spring biassed control element, which control element can influence directly the radially movable push rods during the stoppage phase of the hollow shaft and thus give the dog the control signal according to the pattern in that this dog is controlled into one of its two possible end positions. The solenoid is subjected to electrical current and excited or not excited, in a synchronized sequence by an electronically operating pattern control apparatus. This electronic pattern control apparatus forms no part of the invention and will, therefore, not be described in detail.

Preferably, a hollow shaft rotates intermittently at an 180° in synchronism with the loom and at a short duration of stoppage around the stationary elements of the control system. This hollow shaft includes two recesses located opposite each other by 180°, and the dog engages under action of a spring force into these recesses except it is prevented therefrom in a manner according to the pattern by the corresponding push rod. One radially movable push rod belongs to each respective recess, and the object or function of this rod is to transmit the control position of the control element to the dog.

According to a preferred embodiment the dog is radially guided within the eccentric hoop and is subject to a spring force directed radially towards the center of rotation. If the control system is currentless, i.e. not excited, the spring of the control element, having a larger force than the one within the dog, urges the push rod towards the dog and urges the latter to disengage and move out of the recess of the hollow shaft and to simultaneously engage the recess of the connecting rod which embraces the eccentric hoop. If the hollow shaft continues its rotation after the stoppage phase the eccentric hoop remains together with the dog and the connecting rod in the rest position. Conclusively, the element which is coupled to the connecting rod, e.g. the heald of a weaving machine or loom remains in a rest position, e.g. in the bottom shed position. This condition changes as soon as the solenoid gets excited in the manner according to the pattern and attracts the armature and thus the control element; accordingly, the dog can engage into the recess in the hollow shaft under the influence of the spring force, whereupon the push rod at this side is dislocated in the direction towards the center of rotation while the opposite push rod is pushed into the empty recess of the hollow shaft.

If the hollow shaft continues its rotation after the stoppage phase the eccentric hoop will be taken along, i.e. rotated by the engaged dog and the connecting rod pivots from one end position into the other, together with the heald frame coupled thereto (upper shed position). After the hollow shaft has rotated 180° the next following control command will be initiated. If now the heald has to move in a manner according to the pattern into its bottom shed position for the next following weft insertion the solenoid remains unexcited and the dog remains in the recess of the hollow shaft such that accordingly the eccentric hoop is rotated along and the connecting rod returns into its original initial position. At the end of the 180° rotation of the hollow shaft the control element, which is subject to a higher spring force than the dog urges the latter by means of the push rod radially outwards into the recess of the connecting rod. The heald is again in its bottom shed position.

If the heald must remain in accordance with the pattern, in the upper shed position the solenoid is excited and accordingly attracts the armature and the control element. The control element urges the push rod radially against the dog and the latter out of engagement with the recess in the hollow shaft and into the recess in the connecting rod. If the hollow shaft continues its rotation after its stoppage phase the eccentric hoop remains together with the connecting rod in this position and the heald remains in its upper shed position. In accordance with the pattern, the dog will again engage the recess in the hollow shaft if the solenoid remains unexcited during the control phase.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 illustrates the control system of FIG. 1, in which the solenoid is energized and accordingly its armature attracted and the dog of the coupling apparatus is engaged in the recess of the hollow shaft;

FIG. 3 illustrates the hollow shaft with the dog in its engaged position, after a rotation of 90° and deenergized solenoid;

DETAILED DESCRIPTION OF THE PREFERRED EMBODIMENTS

Figure 1:
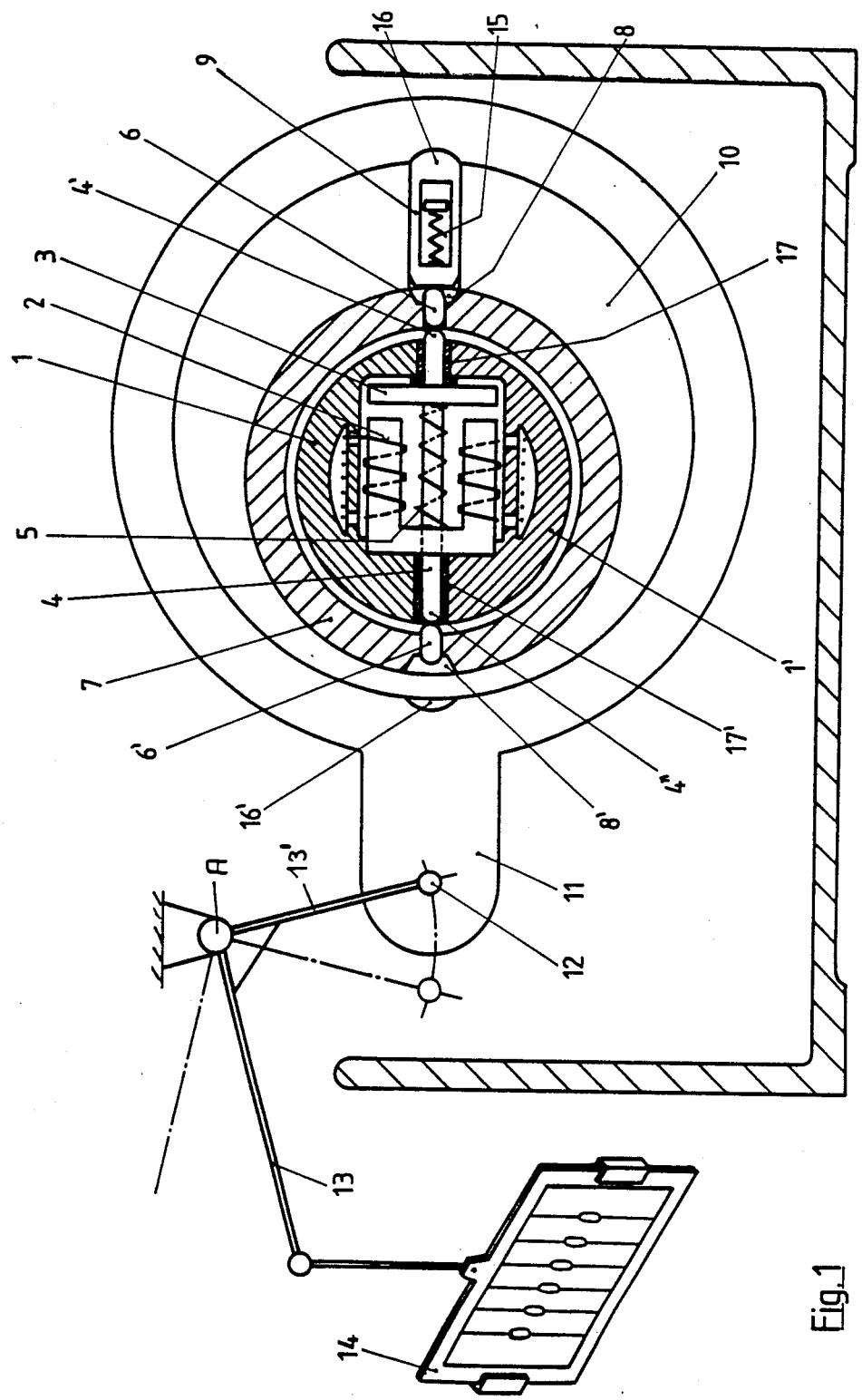
FIG. 1 illustrates schematically a control system including a coupling apparatus of a rotating dobby loom in the stoppage position of the hollow shaft, in which the solenoid is deenergized and the coupling apparatus is in the bottom shed position of the heald frame.

The control system comprises a solenoid 2 mounted in a stationary axis 1, 1' of which the armature 3 is combined with the control element 4 which is acted upon by the spring 5 and urged radially against the push rod 6. An intermittingly rotating drive shaft in the form of a hollow shaft 7 which comes to a short standstill after each half rotation of 180° includes two recesses 8, 8' located opposite one another into which the dog 9 can engage whereby a push rod 6, 6' is located in each recess. The dog is guided radially in the eccentric hoop 10 which in turn serves as a bearing for a connecting rod 11 while the second bearing area 12 of the connecting rod 11 is coupled to the shaft or heald frame 14, respectively via a compound lever arrangement 13, 13' journaled in a fixed bearing A.

Figure 6:
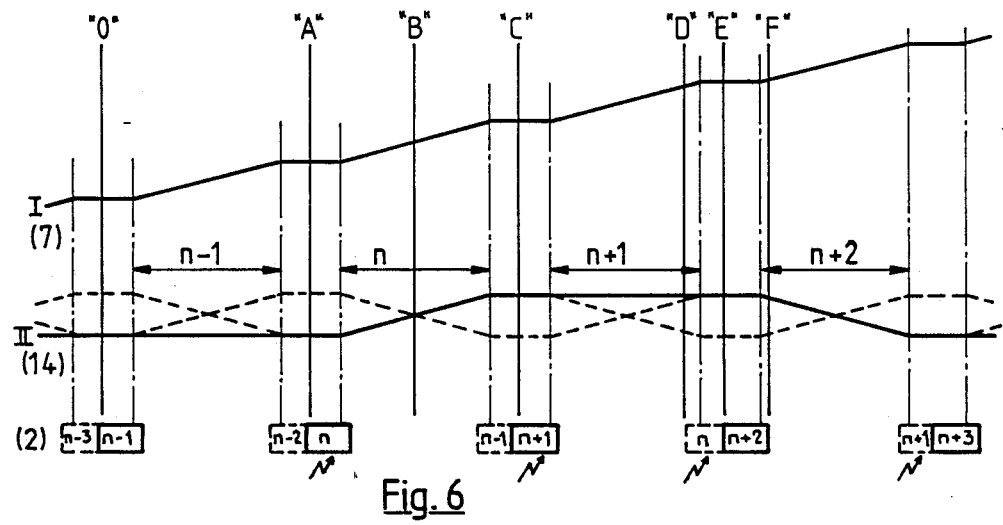
FIG. 6 is a phase diagram of the control system and coupling apparatus.

The very simple operation of the control system described herein is as follows:

FIG. 1 illustrates the stoppage phase of the hollow shaft 7 which is represented in the graph of FIG. 6 by the line I, time vector "0". The solenoid 2 is currentless, not energized and the control element 4 having a head 4' urges the push rod 6 by means of the spring force $F_1$ of the spring 5 towards the dog 9 which is subjected to the spring force $F_2$ of spring 15 ($F_1 > F_2$) thus urging the dog 9 radially outwardly into the recess 16 in the connecting rod 11. The control element 4 is guided at both its ends in bearings 17, 17' to thereby assure an easy axial displacement thereof. Both ends of the control element are designed as ram heads 4' and during the control phase contact the push rods 6, 6'.

Figure 5:
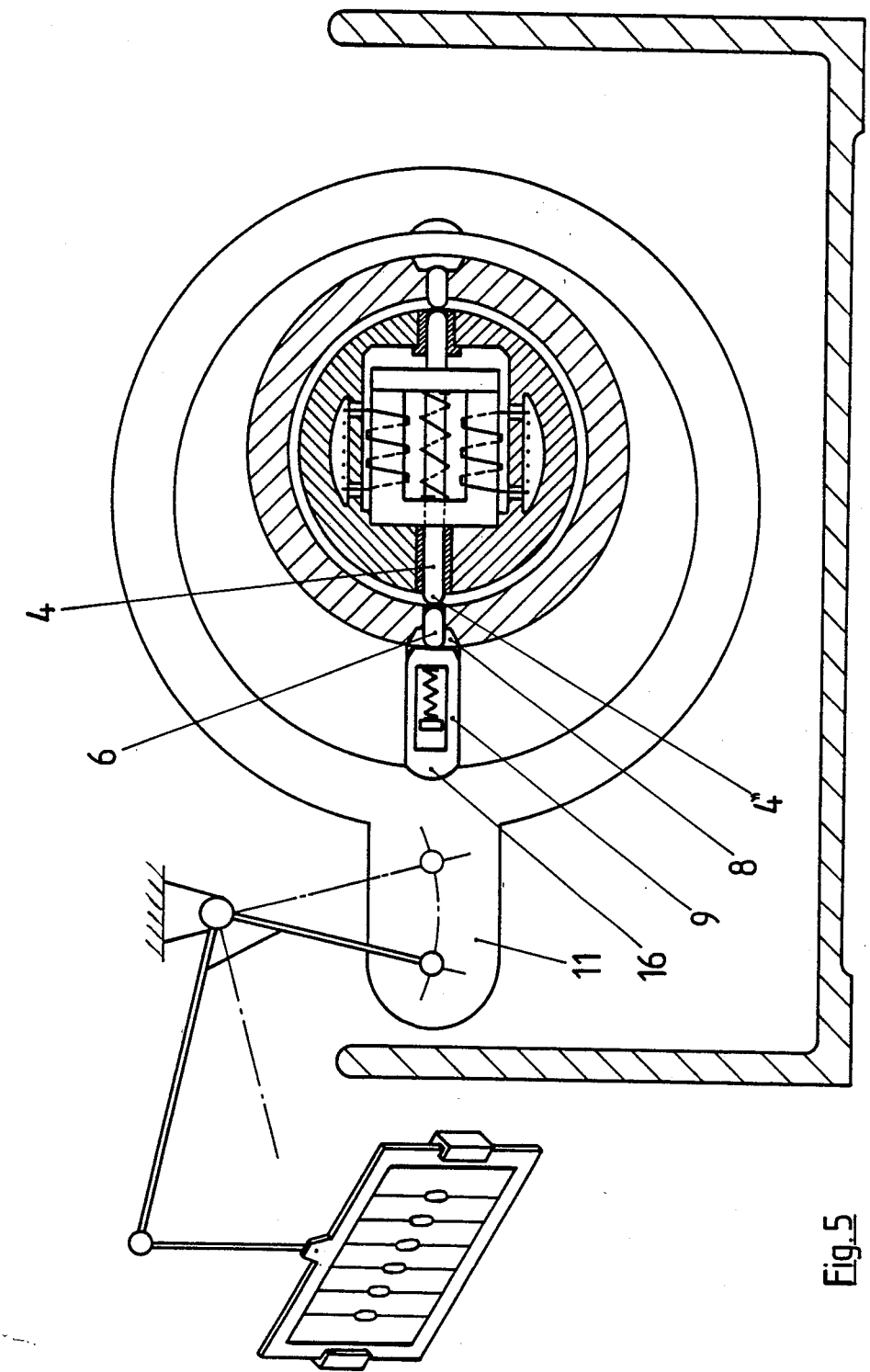
FIG. 5 illustrates the same position as shown in FIG. 4, however with energized solenoid and attracted armature and dog engaged in the recess of the connecting rod.

The position of the connecting rod which is illustrated in FIG. 1 corresponds to an end position of the heald coupled thereto, for instance to the bottom shed position of FIG. 5, line II.

If the hollow shaft 7 starts to rotate the eccentric hoop 10 remains stationary because it is held by the dog 9 engaging into the recess 16 of the connecting rod 11. Before the push rod 6 completely leaves the action area of the dog 9, the outer diameter of the hollow shaft will prevent a radial displacing of the dog 9 towards the center, such that during the semi rotation of the hollow shaft, in FIG. 6 in the area of the time vector "0 to A" the heald remains in its bottom shed position. Towards the end of the 180° rotation the recess 8 moves with the push rod 6 into the area of the stationary dog 9. The push rod 6' slides on the head 4" and prevents the dog when located oppositely of the recess 8' from engaging thereinto. If a further rotation of the hollow shaft 7 occurs after the stoppage phase without the solenoid 2 being energized the operational procedure described is repeated.

FIG. 2 illustrates, in FIG. 6 time vector "A", the control system during the stoppage phase of the hollow shaft 7 and the control command n according to the pattern by the solenoid 2 being energized and accordingly attracted armature 3 including control element 4. The spring 15 inside of the dog 9 urges latter into the recess 8 of the hollow shaft because the push rod 6 can follow the head 4'. The push rod 6' is pushed by the head 4" of the control element 4 into the free recess 8' of the hollow shaft.

Due to the engagement into the recess 8 the dog is form-locked to the hollow shaft while the opposite end 8 of the dog has moved away out of the range of action of the recess 16 in the connecting rod 11.

After the stoppage phase "A" the semi-rotation of the hollow shaft begins which takes the eccentric hoop 10 along to rotate therewith by means of the engaged dog 9.

FIG. 3 illustrates the position of the coupling system after a 90° rotation of the hollow shaft, in FIG. 6 time vector "B".

From FIG. 6 it can be seen that after the beginning of the rotation of the hollow shaft (inclined segments of line I) the solenoid 2 is switched to a deenergized condition and the control element 4 is pushed by the spring 5 radially into its outer position.

At the end of the 180° rotation of the hollow shaft, in FIG. 6 time vector "C", the heald 14 is in the upper shed position. During the stoppage phase of the hollow shaft the new control command according to the pattern, identified in FIG. 6 by n+1 is applied on the solenoid.

Figure 4:
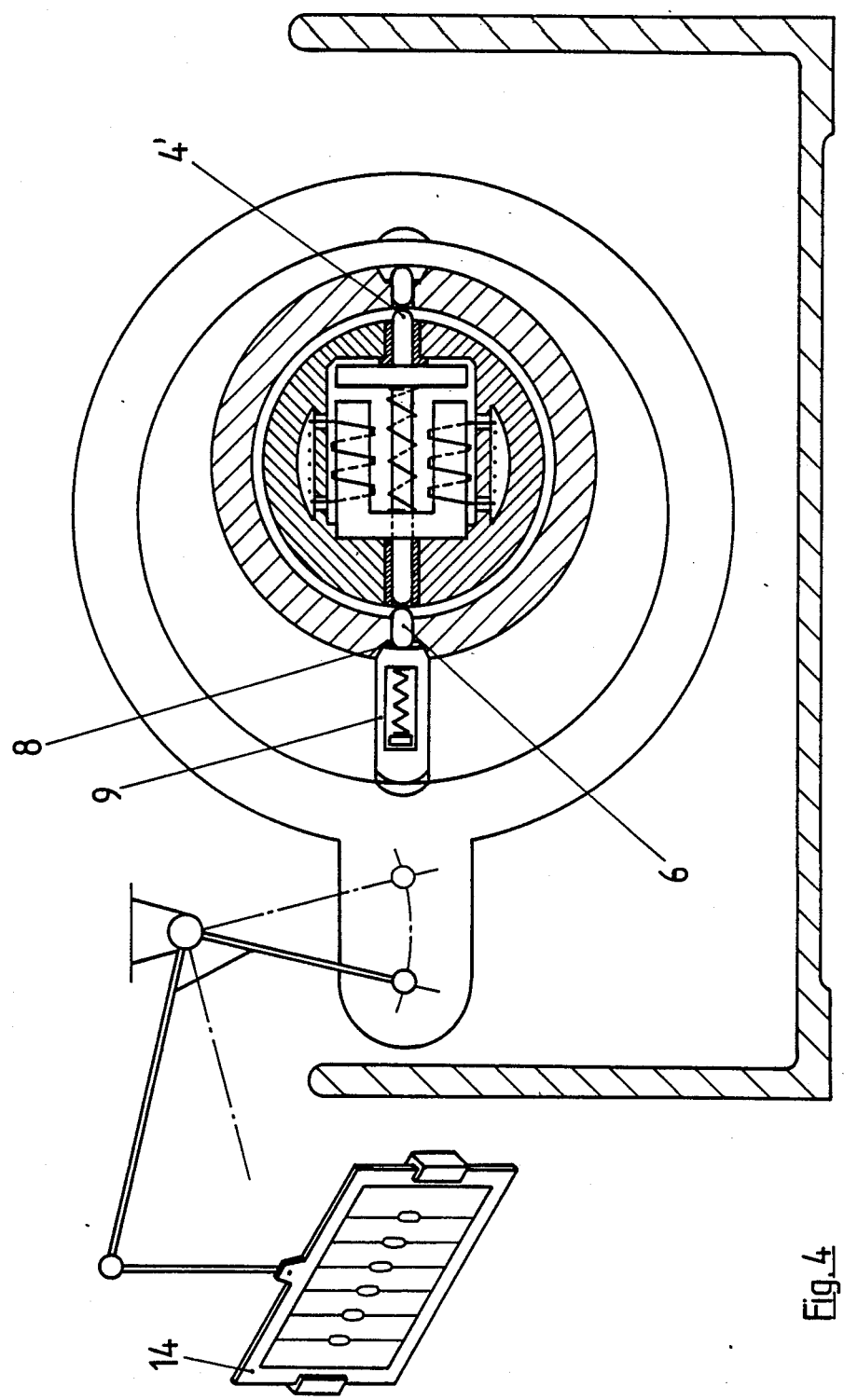
FIG. 4 illustrates the control system and coupling apparatus after a rotation of the hollow shaft of 180° relative to FIG. 1, in the upper shed position of the heald, solenoid deenergized and dog engaged in the recess of the hollow shaft.

If no energizing of the solenoid occurs the dog remains engaged in the recess 8 of the hollow shaft (FIG. 4) and due to the subsequent rotational movement of the hollow shaft the heald is moved into the bottom shed position.

When the push rod 6 closely approaches head 4' of the control element, in FIG. 6 time vector "D", the solenoid 2 is energized by the control command N (FIG. 6) such that the push rod 6 is not in contact with the head 4' until the hollow shaft is in its rest position. Now the new pattern conform control command is applied on the solenoid 2, in FIG. 6 time vector "E".

If the heald 14 has to remain in the bottom shed position (FIG. 1) the solenoid 2 is currentless and the control element 4 urges the push rod 6 due to the action of spring 5 against the dog 9 and the latter is pushed out of the area of action of the recess 8 of the hollow shaft and engages into the recess 16 of the connecting rod 11 such as illustrated in FIG. 1.

If the heald must be brought again into the upper shed position the solenoid 2 remains energized during the complete time span from "D" to "F" (FIG. 6), this means that the dog 9 remains engaged in the recess 8 of the hollow shaft and, therefore, does not make an unnecessary radial control movement.

If the heald must remain in the upper shed position during more than one weft insertion of the weaving machine, corresponding to time vector "C", FIG. 6, the solenoid 2 is energized by the control command n+1 such that the control element 4 urges by means of its head 4" the push rod 6 radially against the dog 9 and pushes the latter into the recess 16' of the connecting rod 11, following which the dog 9 is moved out of the range of action of the recess 8 of the hollow shaft (FIG. 5). After the stoppage position the hollow shaft can continue its rotating while the eccentric hoop 10 is coupled form-locked to the connecting rod 11 and the heald remains in the upper shed position.

The graph of FIG. 6 shows that prior to phase n (movement of the heald for weft insertion n) the control command n−2 is applied onto the solenoid 2; prior to phase n+1 the control command n−1, etc. This sequence of control commands follows in that a push rod 6, 6' will never strike the head 4', 4" of the control element 4 shortly prior to reaching the stoppage phase of the hollow shaft.

The control apparatus described herein and operating in accordance with the graph of FIG. 6 has the considerable advantage that the coupling system operates in a correct weft insertion sequence, i.e. that the dobby loom can be rotated from any position forwards and backwards and that the program according to the pattern can be immediately converted to the correct movement of the heald. This is an important precondition for a simple operation of the machine, specifically during the pick finding operation.

In case of a misinformation, that is if phase n−2 is missing, for instance from the electronic control or upon a program change, the push rod 6, 6' could strike shortly prior to the stoppage phase of the hollow shaft 7 onto the head 4', 4" of the control element 4. Due to the corresponding design of the shape of the push rod 6, 6' and of the head 4', 4" the control element 4 is pushed against the spring 5 and, as soon as the dog 9 has reached the recess 16, 16' in the connecting rod 11, it will be pushed by the spring 5 into this arresting position (bottom shed position of the heald).

Figure 7:
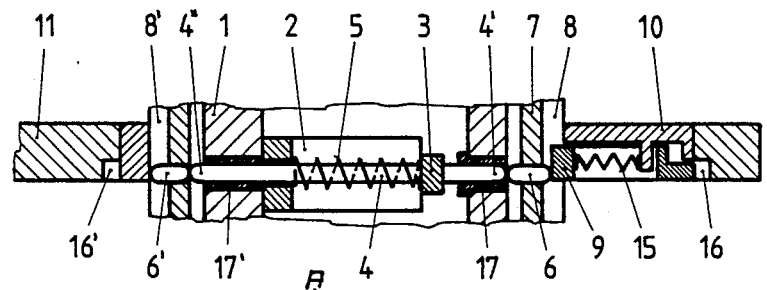
FIG. 7 illustrates a horizontal section through the control system and coupling apparatus of FIG. 2.

FIG. 7 illustrates a horizontal section of the control and coupling apparatus shown in FIG. 2.

Figure 8:
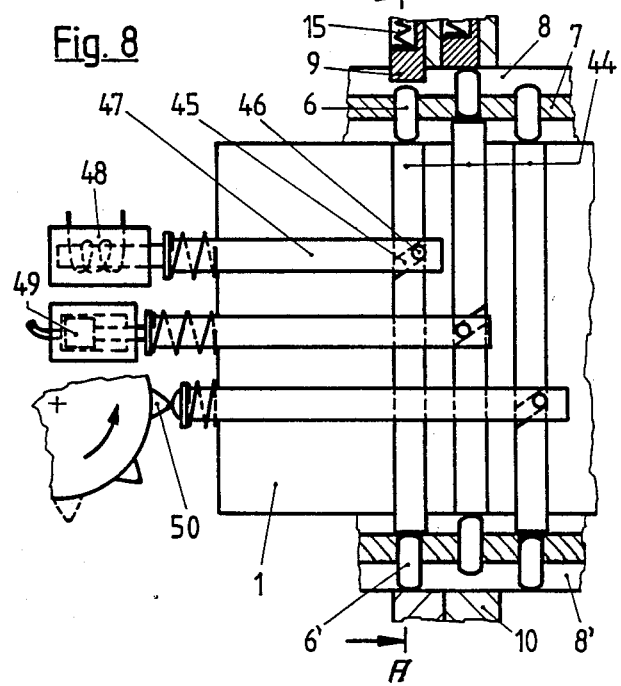
FIG. 8 illustrates the actuating of the control elements by elements located at the face side of the supporting axis, such as solenoid, hydraulic and pneumatic cylinders, mechanical elements.
Figure 9:
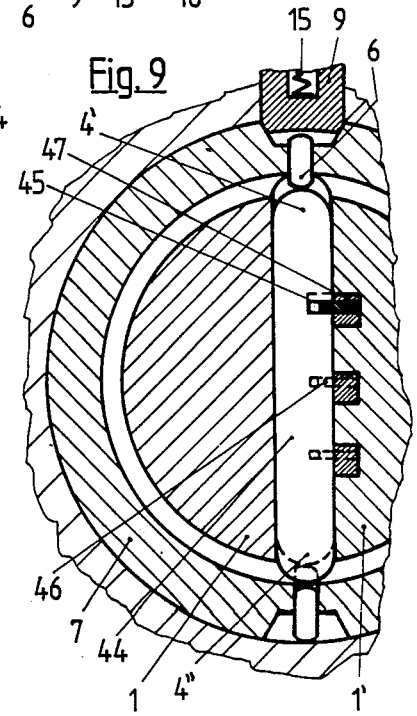
FIG. 9 is a section through line A—A of FIG. 8.

Shown in FIGS. 8 and 9 is the manner in which the control elements 44 can be possibly operated axially from outside of the axis 1, 1'. The control elements 44 are guided radially in the axis half 1 and include for instance a groove 45 extending obliquely relative to their direction of movement, and a connecting rod 47 engages with its cams 46 into this groove 45, such that upon an axial movement of these connecting rods 47 due to solenoids 48, hydraulic or pneumatic cylinders 49 or mechanically, e.g. by cams 50 the control elements 44 are moved radially in a manner according to the pattern.

Figure 10:
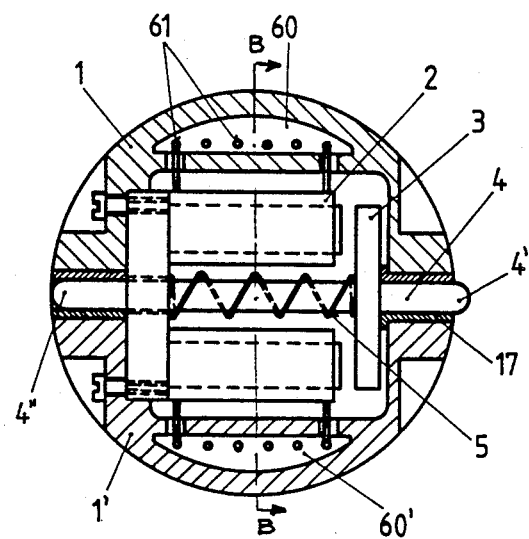
FIG. 10 is a section of a bipartite axis, including solenoid.
Figure 11:
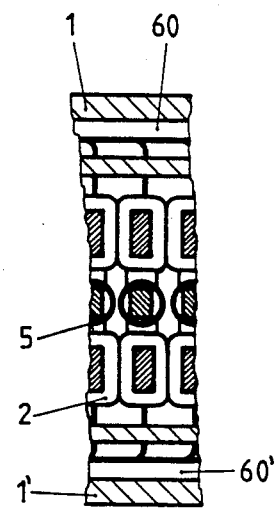
FIG. 11 is a partial section through line B—B of FIG. 10.

A possible arrangement and mounting of the solenoids is illustrated in FIGS. 10 and 11. Axially extending hollow spaces 60, 60' are provided in both halves 1, 1' of the axis and the electric circuitry 61 for the solenoids 2 are located in these halves. Furthermore, a cooling medium such as e.g. air may flow through the hollow spaces 60, 60'.

Figure 12:
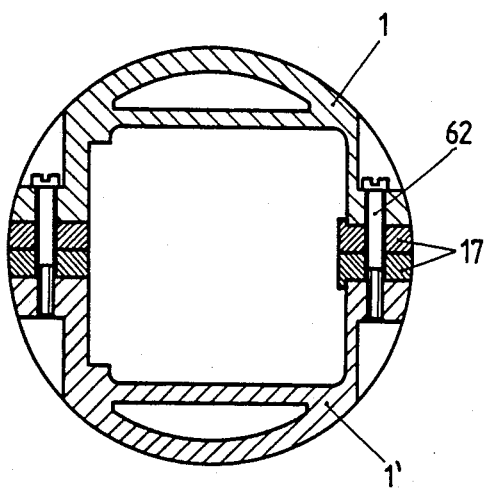
FIG. 12 is a section through a bipartite axis similar to FIG. 10.
Figure 13:
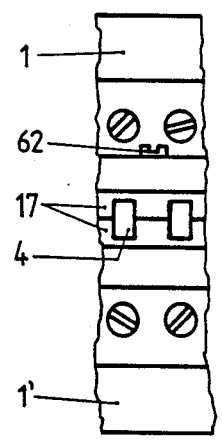
FIG. 13 is a side view of a part of the structure shown in FIG. 12.

Regarding the assembling and maintenance of the control apparatus it is of advantage to have the axis designed such to have two axial halves 1 and 1'. FIGS. 12 and 13 illustrate one possibility of holding the halves 1, 1' together by means of screw bolts 62.

Figure 14:
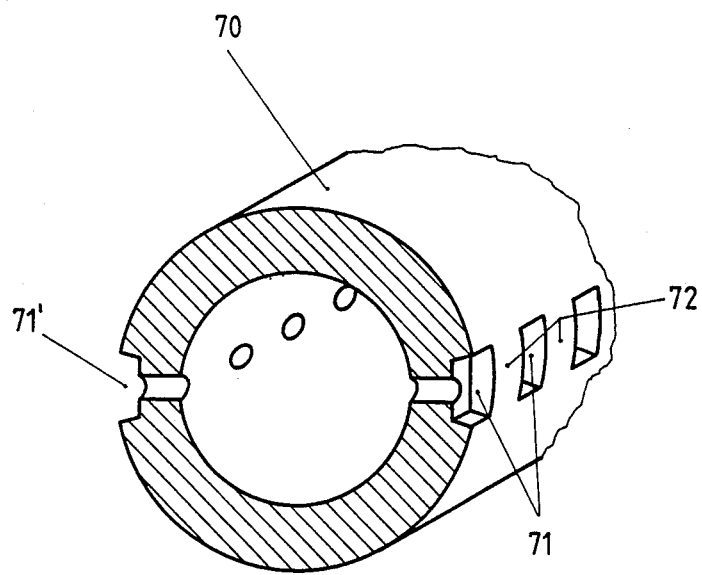
FIG. 14 illustrates a hollow shaft with recesses which are not continuous in axial direction.

A design of the hollow shaft 70 in accordance with FIG. 14 is advantageous. The recesses for the dogs are shaped as pockets 71 and 71' in the hollow shaft 70 such that a continuous bearing surface 72 is provided for the bearing points between the hollow shaft 70 and the eccentric hoop, respectively.

Figure 15:
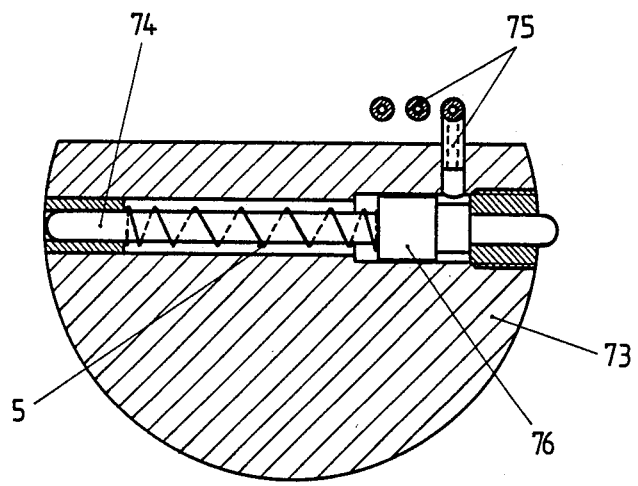
FIG. 15 illustrates a section through the axis and a fluid actuated control element.

FIG. 15 illustrates the mounting of fluid actuated control elements. The control element 74 which is designed in form of a piston 76 is located within the axis 73.

At the unidirectionally acting piston 76 the spring 5 urges the control element 74 into a radial end position. The feed lines 75 can be located in the free space between the axis 73 and the hollow shaft.

Figure 16:
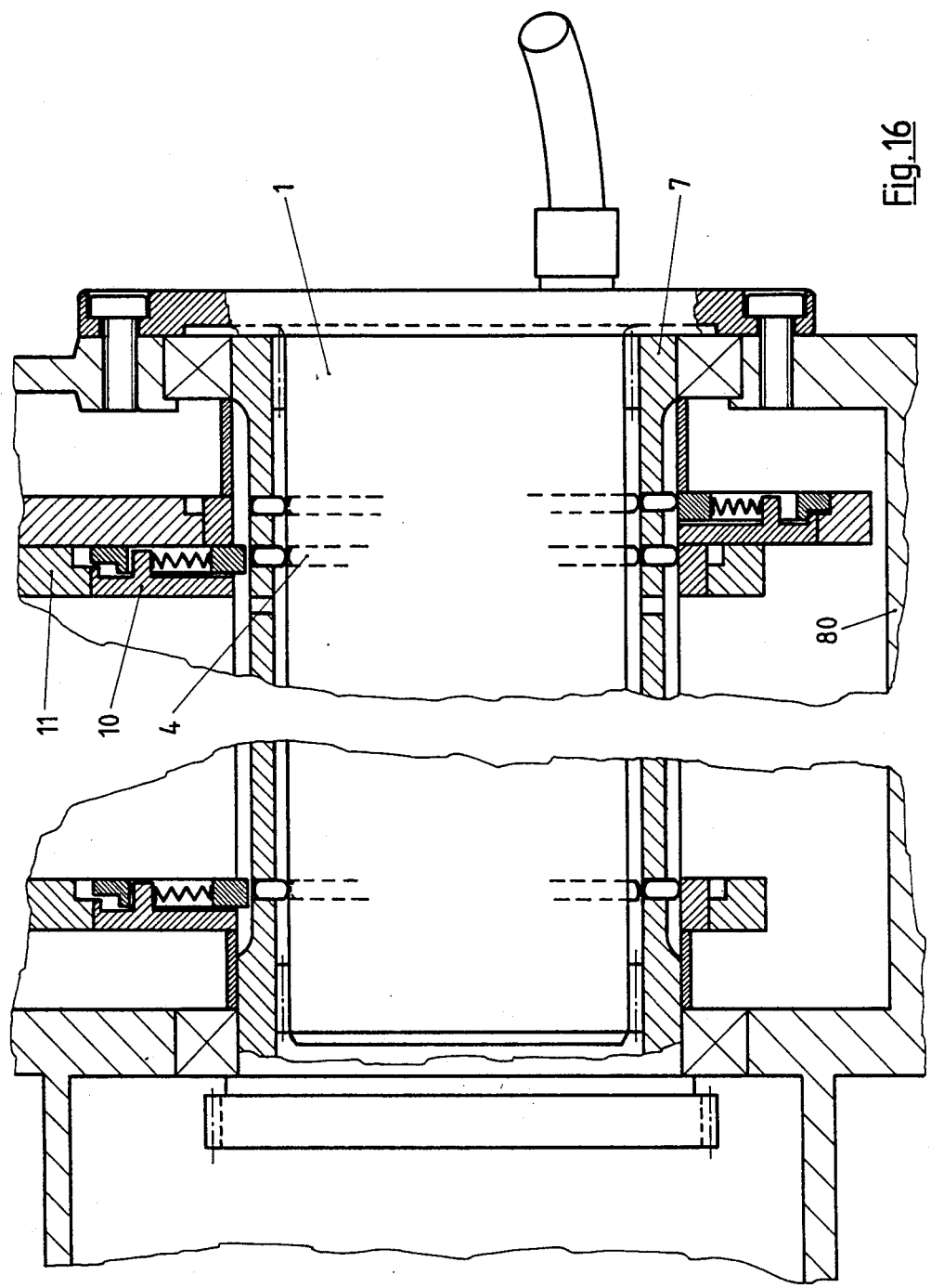
FIG. 16 is a longitudinal section through the dobby loom including the heald control elements.

FIG. 16 illustrates a section through a simple embodiment of a construction according to the invention, embodying particularly the hollow shaft 7 and the stationary axis or support 1. The easy assembling and maintenance attributes of the invention is that the axis 1 is supported in the simplest manner in the hollow shaft 7 and may be disassembled and assembled in the form of a complete unit.

While there are shown and described present preferred embodiments of the invention, it is to be distinctly understood that the invention is not limited thereto, but may be otherwise variously embodied and practiced within the scope of the following claims.

I claim:

1. A control system of a coupling apparatus, specifically of a rotary dobby for a loom, including a drive shaft, at least one eccentric hoop supported rotationally thereupon including a connecting rod arranged circumferentially about said hoop, the connecting rod adapted to be coupled to a member which is to be moved in a controlled manner, specifically a heald of a weaving machine, further including a dog which is supported in said eccentric hoop in a radially displaceable manner to said hoop and is movable via operating and control means into engagement either into one of two recesses of said connecting rod or into one of two recesses of said drive shaft, in which said operating means and at least parts of said control means for the dog are located inside of said drive shaft.

2. The control system of claim 1, wherein said drive shaft is a hollow shaft having an inner space and in which there is provided a stationary support in form of a rigid axis in the inner space of said hollow shaft, said control means including a movable control element, and said support including a lateral passage for the movable control element provided for the connecting rod, said lateral passage having two diametrically oppositely located bearing areas for the control element which control element is longer than the diameter of the support and is controllably movable back and forth in a radial direction of said support, and in which said hollow shaft includes two radial passages respectively located diametrically opposite one another and aligned with outer recesses provided in the hollow shaft, further in which there are provided push rods respectively being radially slidably supported in said radial passages, and said push rods each having a length exceeding the thickness of the wall of said hollow shaft at said outer recesses to allow engagement and disengagement of the dog which extends into each recess, and the control means controlling movement of the control element.

3. The control system of claim 1, wherein said drive shaft comprises a rotary hollow shaft which rotates intermittently in synchronism with the loom and at a short duration of stoppage, a spring for biasing said dog for radial movement into one of the two recesses located diametrically opposite and in the outer surface of said hollow shaft, said recesses of said connecting rod being diametrically oppositely located for said dog, said outer recesses in said hollow shaft and in said connecting rod being such that said dog always engages into one of the outer recesses and recesses, respectively in a form-locked manner while a non-engaged end of the dog has a limited radial freedom of movement due to its abutment against the outer circumference of the hollow shaft or the inner circumference of the connecting rod, said control means including a control element, and further comprising a stationary axis located within said hollow shaft, said control element being located within said axis, said control element being movable back and forth in radial direction and being operative to transmit an introduced control command via radially movable push rods located adjacent the outer recesses in said hollow shaft and rotating with said shaft into alignment with said dog as said eccentric hoop maintains by means of said connecting rod an element coupled thereto in one of two end positions and as the hollow shaft stops during a short time span and the dog couples in accordance with the control command said eccentric hoop in a form-locked manner to said connecting rod.

4. The control system of claim 3, wherein a spring is provided for said control element for subjecting said control element to a spring force greater than the force of the dog spring, said control element being actuatable by a solenoid having an armature which is coupled to the control element, said control element at a deenergized condition of said solenoid releasing one of the push rods within its range of movement and the dog, due to the spring force of the dog spring, engages into the recess of the hollow shaft and pushes the oppositely located push rod outwardly, and if the dog is in alignment with the pushed push rod, urges the dog out of the recess in said hollow shaft against the weaker spring force of the dog spring and into the recess in said connecting rod, whereby further rotation of said eccentric hoop is prevented.

5. The control system of claim 3, wherein said control element is radially guided in said axis and is movable and is operative to axially actuate the push rods and accordingly the dog by mechanically transmittable external commands.

6. The control system of claim 3, including a control element comprising a pneumatic or hydraulic operating, single-acting cylinder and a piston subjected to a spring force, said piston comprising said control element.

* * * * *